US006579445B2

(12) United States Patent  
Nachtman et al.

(10) Patent No.: US 6,579,445 B2
(45) Date of Patent: Jun. 17, 2003

(54) SYSTEM FOR THE PRODUCTION OF LABORATORY GRADE ULTRAPURE WATER (75) Inventors: Charles T. Nachtman, Dubuque, IA (US); William P. Johll, Jr., Dubuque, IA (US); Helmut R. H. Gideon, Dubuque, IA (US); Timothy T. Dunwoody, Dubuque, IA (US); Jamie C. Carr, Dubuque, IA (US); Thomas Scholz, Mt. Sinai, NY (US)

(73) Assignee: Sartorius AG, Goettingen (DE)

( * ) Notice: Subject to any disclaimer, the term of this patent is extended or adjusted under 35 U.S.C. 154(b) by 12 days.

(21) Appl. No.: 09/872,664

(22) Filed: Jun. 1, 2001

(65) Prior Publication Data
US 2002/0179508 A1 Dec. 5, 2002

(51) Int. Cl.[7] .................................................. C02F 9/12
(52) U.S. Cl. ........................ 210/85; 210/136; 210/192; 210/259; 210/264; 210/266; 210/269; 210/286; 210/900; 340/620; 73/64.56; 73/61.41
(58) Field of Search .......................... 210/85, 96.1, 136, 210/278, 284, 286, 257.1, 259, 290, 900, 321.67, 264, 266, 192, 269, 294, 321.6; 338/38; 340/620; 73/64.56, 61.41; 422/186.3, 82.02, 82.03

(56) References Cited

U.S. PATENT DOCUMENTS

| 4,784,763 A | * | 11/1988 | Hambleton et al. |
| 5,356,849 A | * | 10/1994 | Matviya et al. |
| 5,399,263 A | | 3/1995 | Chomka et al. |
| 5,573,665 A | * | 11/1996 | Frommer et al. |
| 5,651,894 A | | 7/1997 | Boyce et al. |
| 5,762,804 A | * | 6/1998 | Striefler |
| 5,798,040 A | | 8/1998 | Liang |
| 5,868,924 A | * | 2/1999 | Nachtman et al. |
| 5,895,570 A | | 4/1999 | Liang |
| 5,902,751 A | * | 5/1999 | Godec et al. |
| 5,919,357 A | | 7/1999 | Wilkins et al. |
| 5,925,240 A | | 7/1999 | Wilkins et al. |
| 5,935,441 A | | 8/1999 | O'Neill et al. |
| 6,328,896 B1 | * | 12/2001 | Atnoor et al. |
| 6,398,965 B1 | * | 6/2002 | Arba et al. |

* cited by examiner

Primary Examiner—Joseph Drodge
Assistant Examiner—Terry K. Cecil
(74) Attorney, Agent, or Firm—Chernoff, Vilhauer, McClung & Stenzel, LLP (57) ABSTRACT There is disclosed a system capable of purifying water to a laboratory grade level that uses redox media, high energy catalytic activated carbon, ultraviolet radiation and high purity ion exchange media in series filtration. The system produces purified water having a specific resistance of at least 18.2 megohm·cm at 25° C. with low organic carbon content. The system is designed to be fabricated on a sufficiently small scale to fit on a lab bench top.

8 Claims, 7 Drawing Sheets

SYSTEM FOR THE PRODUCTION OF LABORATORY GRADE ULTRAPURE WATER

BACKGROUND OF THE INVENTION

Increasingly sophisticated laboratory equipment and analyses create the need for a ready supply of laboratory grade ultrapure water that is used in such laboratory methods as high performance liquid chromatography, gas chromatography, trace metal analysis by atomic absorption spectrometry, tissue culturing and the like.

Most impurities in potable water are in the form of ionized inorganic mineral salts that lend a degree of conductivity/resistivity to the water and thus render the water susceptible to precise measurement of its purity. The most common measure is by specific resistance, typically measured in units of ohm·cm at a reference temperature of 25° C.; absolutely pure water has a theoretical specific resistance of 18.17 megohm·cm.

A minority of the impurities in potable water comprise organic contaminants which do not typically bear an ionic charge. Accordingly, such organic contaminants are not measurable in the same fashion as are inorganic impurities. A preferred level of total organic content (TOC) in ultrapure laboratory grade water is no more than a few parts per billion (ppb).

There is an ongoing need to provide laboratory grade ultrapure water on a short term, real time basis, preferably from a supply located in the very laboratory where the research and analysis work is being conducted. This need is met by the present invention, which is summarized and described in detail below.

BRIEF SUMMARY OF THE INVENTION

The present invention comprises a system for the production of laboratory grade ultrapure water utilizing a unique combination of purification media contained in a series of dual housings and preferably coupled with ultraviolet (UV) and ultrafiltration (UF) treatment and a novel arrangement of dispensing, solenoid valves, check valves and sensor devices.

DETAILED DESCRIPTION OF THE INVENTION

Feed Water

The system is designed to operate on feed water that originates from a safe drinking water source that has been further treated by reverse osmosis (RO), distillation or electrical (EDI) or conventional deionization (DI). The feed water should originate from a source that complies with the U.S. Environmental Protection Agency National Primary Drinking Water Regulations or comparable European Union or Japanese standards. The system is capable of operating directly on potable tap water on sources containing no greater than 500 parts per million (ppm) of total dissolved solids as calcium carbonate equivalents, provided that such water having total organic carbon (TOC) levels above 1.5 ppm may require additional pretreatment with activated carbon and/or filtration. To realize economic efficiencies from the system direct potable water sources require special application limits, which will vary significantly due to varying feed water quality and to volume requirements, and so should be carefully scrutinized on an individual basis. Those of ordinary skill in the art will realize that pretreated feed sources are preferred in the majority of installations. During pretreatment, inorganic, organic and particulate species are reduced or eliminated, providing purification and economic efficiencies.

Media Housings

The preferred housings for containment of the purification media comprise at least two dual housings wherein each dual housing has two juxtaposed chambers separated by a common wall in such a fashion that the chambers are in series fluid communication with each other wherein the flow is from top to bottom. Such dual housings are shown in FIGS. 5–8 and are disclosed in greater detail in commonly assigned U.S. application Ser. No. 09/733,770 filed Dec. 8, 2000, now U.S. Pat. No. 6,383,382 the disclosure of which is incorporated herein by reference.

As shown in FIGS. 5–8 there is shown a dual chamber media housing 1 comprising a housing body 10 having a top end cap 12 and a bottom end cap 14. End caps 12 and 14 are preferably provided with reinforcing ribs 30. Top end cap 12 is provided with fluid inlet port 18 and fluid outlet port 28. Top end cap 12 may also be provided with a latch boss 13 and mounting bosses 131 for securing an inlet and outlet nozzle assembly (not shown), said assembly being the subject of commonly assigned U.S. Application Ser. No. 09/733,588, filed Dec. 8, 2000. Housing body 10 and end caps 12 and 14 may be made of any suitable material such as 316 or 316L stainless steel or thermoplastic polymers, preferably the latter and the three components may be secured together by any suitable means; in the case of thermoplastic polymers the three components are preferably welded together. Preferred polymeric materials of construction include polyethylene, polypropylene, polytetrafluoroethylene, polyvinylidene fluoride, fluorinated ethylen/perfluoroalkyl vinyl ether copolymer and polyetheretherketone.

Housing body 12 includes first chamber 20 and second chamber 24 bound together by common wall 20–24. Both ends of both first chamber 20 and second chamber 24 are fitted with porous screens 16 to act as both a prefilter for large particles and to retain filtration and/or adsorption media, the screens fitting into screenreceiving recesses 17 countersunk into housing body wall 11 and common wall 20–24. The porous screens in the dual housing may be constructed of the same types of material as the dual housing.

In operation, fluid to be filtered or otherwise treated with media such as activated carbon, ion exchange media or other treatment material enters fluid inlet port 18 in top end cap 12, flows downwardly through porous screen 16 and first chamber 20, then downwardly through media contained in first chamber 20 through lower screen 16, then encounters first chamber flow collector 21 which directs the first chamber permeate upwardly through first chamber permeate plenum 22 to the top of second chamber 24. At the top of second chamber 24 the fluid permeate from the first chamber encounters second chamber flow distributor 23, which causes the flow to be distributed uniformly downwardly through porous screen 16 and the media of second chamber 24. At the bottom of second chamber 24 the permeate flows through screen 16 and encounters second chamber flow collector 25 which directs the fluid permeate upwardly through second chamber permeate plenum 26 and out through permeate outlet port 28.

Purification Media

Use of five types of purification media are preferred: (1) redox media; (2) acid-washed bituminous activated carbon; (3) high energy bituminous grade or acid-washed coconut shell activated carbon; (4) semiconductor grade mixed bed ion exchange resin; and (5) catalytic activated carbon having a maximum peroxide number of 14. Water travels downward through all purification media so as to prevent fluidization and separation of the media based on variable particle density. In general, based upon the volume of each chamber in the dual housings, virtually any percentage of any of these media may be used, to be adjusted according to the impurities of the feed water. Details of preferred aspects of these purification media, including preferred volume percentages to be used with typical feeds, follow, all discussed in the context of the system depicted in FIG. 1.

The preferred redox media comprises a granulated Zn/Cu alloy commercially available as KDF 55 from KDF Fluid Treatment, Inc. of Three Rivers, Mich. Such redox media is designed to efficiently remove or reduce free chlorine and water-soluble heavy metals while at the same time providing control of bacteria and algae that may be present in the feed water. The redox reaction reduces free chlorine in the feed water to chloride ions that will be removed downstream by the ion exchange resin. Bacteria and other microorganisms are killed by the production of peroxides and hydroxyl free radicals formed as water passes through the media. As noted below and shown in FIGS. 2–4, catalytic carbon is added downstream of the redox media to eliminate the peroxides generated by the media. Microbial growth is further inhibited due to direct contact with the redox media and to electron transport interference. Heavy metal removal occurs by way of electrochemical plating of the heavy metal species onto the redox media as the heavy metal species contact the media.

The preferred amount of redox media used in the dual chamber housings of the invention is 1–10 vol %, more preferably 8 vol % of the contents of a single chamber of the dual chamber housings, based upon a flow rate of up to 2.5 L/min (0.6 gpm), preferably 1.5 L/min (0.36 gpm). Such redox media provides a number of significant advantages, particularly in a laboratory scale water treatment device, over conventional treatment schemes. The redox media is capable of efficiently removing chlorine at up to 10–20 times the capacity of activated carbons typically used for chlorine removal. Its use upstream of activated carbon extends the life of the activated carbon and improves the organics removal efficiency of the activated carbon, principally due to the reduced concentration of chlorine, which effectively allows more surface area for adsorption of organics. Simply stated, the surface area of the carbon is used to adsorb organic material instead of reacting with chlorine. In a small scale purification scheme where the volume of media is quite limited, this amounts to a substantial advantage, permitting a higher flow rate due to the greater efficiency of treatment.

Water supplied from RO systems or distillation systems typically utilize a storage tank to hold the treated water. Storage tanks, due to the stagnant nature of the vessels, can provide a significant environment for bacteria and algae to proliferate. These vessels tend to be forgotten or ignored when it comes to scheduled cleaning and sanitization. Central ion exchange systems can also provide a source of bacterial contamination that can be transported to the point of use water purification system. When used as the first or one of the first purification media to contact the feed water, redox media provides bacteriostatic protection at the inlet to the system, thus reducing the potential for bacterial fouling of the other purification media located downstream. This is an especial advantage for a point-of-use water product arising from feed water supplied from a storage reservoir or from a central ion exchange system. When bacterial counts are reduced, the amount of bacterial endotoxins released into the system is also reduced. In addition, demand on the ultrafiltration and final filtration devices of the system is reduced.

In addition to plating out of heavy metal ions, the redox media will also react with divalent cations found in feed water sources, causing precipitation of the ions. Heavy metals will chemically attach to the redox media. Divalent cations will precipitate as particles. Depending on size, the particles may stay suspended or settle out of solution. In this case, the particle can physically accumulate on the media, carbons or filters, preventing water contact and plugging or fouling the media or filter. Due to the generally low heavy metal and divalent cation content of the majority the preferred of feed water sources mentioned above, periodic backwashing of the redox media should not be required.

In cases where feed waters contain TOC levels of 1.5 ppm or greater such as in tap water, poor quality deionized feed water or other problematic feed sources a small amount of "sacrificial" activated carbon may be added upstream of the redox media to protect the redox media from organic fouling. Such activated carbon is "sacrificial" in the sense that it is fouled by organics so as to protect the redox media from organic fouling. High organic carbon load in a feed water source will coat the redox media and prevent water contact that diminishes redox activity; activated carbon located upstream prevents this from happening. The preferred activated carbon for protecting the redox media consists of acid-washed bituminous grade 20×50 US mesh granular activated carbon, commercially available from Barnebey & Sutcliffe Corp. of Columbus, Ohio. Bituminous grade and other coal-based activated carbons contain a higher degree of larger pore sizes (macropores) that are-better applied to removal of larger molecular weight organic compounds typically found in potable water or other high TOC sources.

Another preferred purification media is a granular activated carbon specifically designed for the removal of ozone and low molecular weight organic compounds, including organic acids, preferably (i) high energy bituminous grade or (ii) acid-washed coconut shell activated carbon, most preferably the latter. An example of (i) is Calgon Filtrasorb 600 which is currently applied to low molecular weight organic carbon removal for remedial purposes. Unfortunately, the Filtrasorb 600 product is only available in 12×40 mesh. Preferably, for the present invention, a 20×50 mesh material would be most efficient. Coconut shell-based activated carbon media has been used for the removal of low molecular weight organic carbon contaminants from water. Coconut shell-based activated carbons contain a higher fraction of small pores or micropores that are important for removal of low molecular weight organic compounds and trace level quantities of organics. A preferred example of (ii) is of 20×50 mesh size and commercially available from Barnebey & Sutcliffe Corp. of Columbus, Ohio.

Such purification media is preferably present in an amount ranging from 20 to 80 vol % of the contents of a single chamber of the dual chamber housings, more preferably 25 to 75 vol % based upon the flow rate mentioned above.

Since the majority of installations for the water purification system of the present invention will have a pretreated feed water source, it is expected that the feed water will contain reduced quantities of low molecular weight organic carbon. For example, RO membranes have a molecular weight cutoff in the range of 200–300 Daltons. This generally indicates that product water from an RO system will contain only about 0.1% of the organic compounds from the feed water source of a molecular weight at, or above, 200 Daltons. If present, the majority of organic compounds with a molecular weight below 200 Daltons will pass the membrane. Similarly, distilled water will generally only contain organic compounds with a boiling point less than or equal to that of water (100° C.). Therefore, only the lower molecular weight or more volatile compounds will tend to be found in distilled water feed source to the system of the present invention. DI water, due to pretreatment schemes and the ability of the ion exchange resins to absorb large molecular weight organic contaminants, will also typically contain low molecular weight organic carbon compounds. However, DI water from large central systems or service exchange systems may at times produce significant amounts of organic carbon of varying molecular weights and so must be monitored more closely for organic contamination than product waters from other modes of pretreatment due to susceptibility of ion exchange resins to oxidation and pretreatment breakthrough. Distilled, RO and DI waters typically contain organic carbon levels in the ppb or $\mu$g/L levels. Potable waters normally contain organic carbon levels at ppm or mg/L levels. DI water, although normally containing low molecular weight organics, can be problematic. Therefore, it is preferred that sacrificial carbon be provided before the redox media, as shown, for example, in FIG. 2.

It should also be noted that newly installed water pretreatment systems, including RO, DI, EDI and distilled, may provide a source of higher molecular weight organic carbon compounds dissolved or suspended in the water stream from the plumbing used to deliver the water. These compounds may include mold release lubricants, plasticizers, soldering flux and plastic polymers of the plumbing. These potential contaminants in new installations tend to diminish with time in service. This fouling potential would further recommend the use of the sacrificial carbon to protect the redox media.

Another preferred media consists of high purity semiconductor grade mixed bed ion exchange resin. This resin comprises chemically equivalent amounts of approximately 40 vol % strong acid cation resin proportionally mixed with approximately 60 vol % strong base anion resin. The preferred material is commercially available as Ionac NM60-SG mixed bed ion exchange resin from Sybron Chemicals of Birmingham, N.J. This media is designed to remove essentially all ionic contaminants originating from the feed water source and from the ions freed from the activated carbon and/or catalytic media located upstream in the system. The preferred amount of such mixed bed resin media is generally in the range of from 40 to 100 vol %, based upon the total contents of a single chamber of the dual chamber housings and at the same flow rate mentioned above. Such ion exchange resin is capable of producing water with a specific resistance of 18.2 megohm·cm corrected to 25° C. with trace amounts of readily extractable organic carbon effluent sloughing off the resin. Such ion exchange resin media is preferably located in the second chamber of the first dual housing A of FIG. 1 and preferably makes up 100% of the volume in this chamber for most applications contemplated. This bed also provides a substantial portion of the total ion exchange capacity of the system.

Effluent from the first dual chamber housing is preferably then treated with ultraviolet (UV) radiation, discussed in greater detail below.

Figure 1:
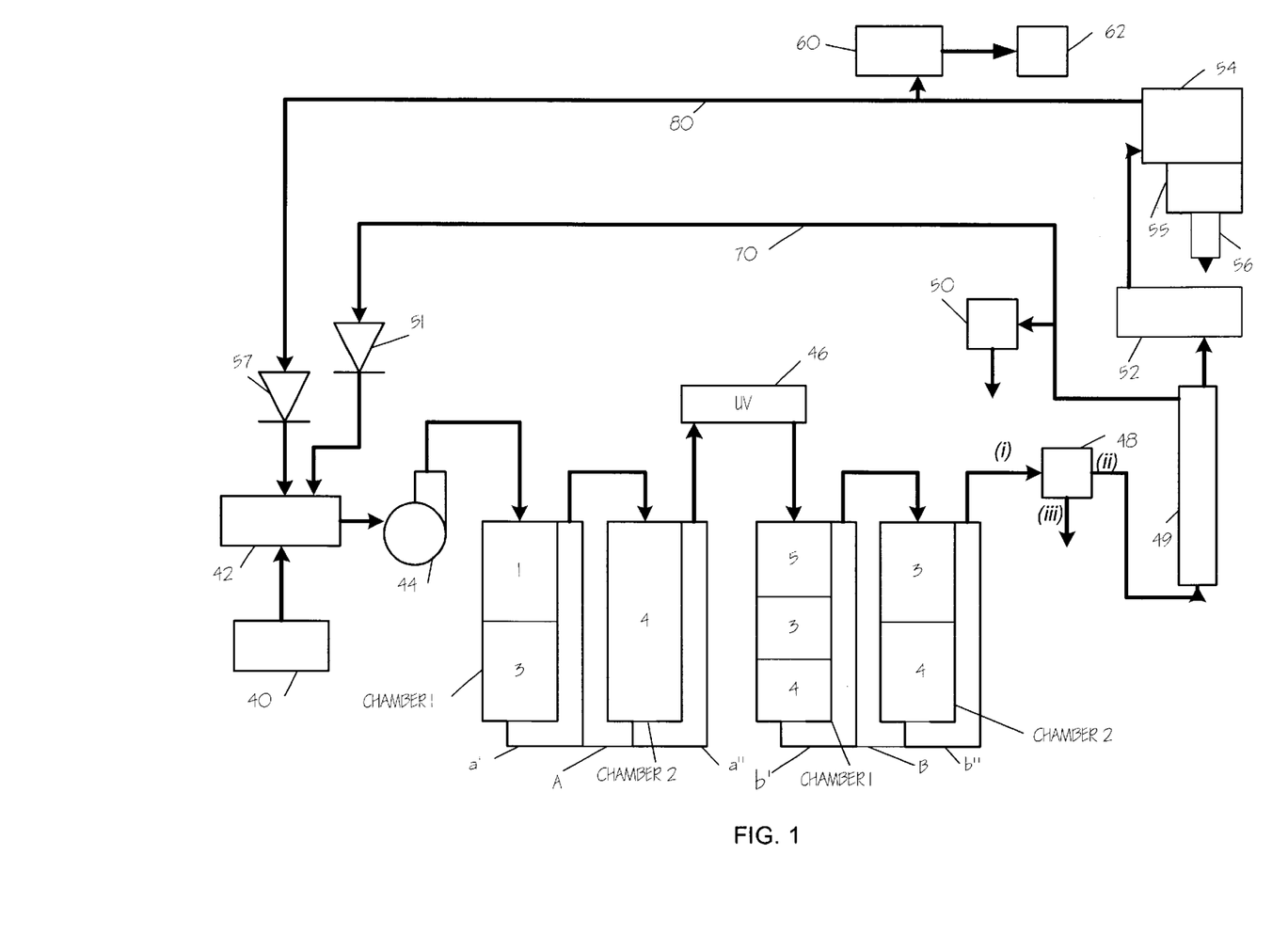
FIGS. 1–4 are schematics showing four exemplary embodiments of the invention.

In order to prevent damage to ion exchange resins located downstream of the UV chamber when UV treatment is used, a fourth bed of catalytic activated carbon is preferably used as the first media contacted in a second dual chamber housing B of FIG. 1. The catalytic activated carbon is designed specifically for removal of hydrogen peroxide, thereby protecting downstream ion exchange resin from oxidation. The preferred form of this media is a 20×50 mesh bituminous-based material comprising a mixture of oxidized and calcinated bituminous coal and coal tar pitch, as described in U.S. Pat. No. 5,356,849, the disclosure of which is incorporated herein by reference. The media is commercially available as Centaur® from Calgon Carbon Corporation of Pittsburgh, Pa. Due to its much greater peroxide activity relative to conventional activated carbons, much greater protection of the downstream ion exchange resins is realized. The media preferably exhibits a maximum peroxide number of 14. The peroxide number is a measure of how quickly the media decomposes hydrogen peroxide. By way of comparison, conventional bituminous-based activated carbon typically exhibits a peroxide number of 40, while lignite coal-based exhibits a peroxide number of 60 and coconut-based exhibits a peroxide number of >120. The preferred amount of such catalytic activated carbon media is 15 to 30 vol %, more preferably 16.6 to 25 vol % based upon the total volume of a single chamber of the dual housings and the same flow rate mentioned above.

The products of the catalytic carbon media/peroxide reaction are water and oxygen, with the amount of oxygen produced being stoichiometric to the amount of peroxide destroyed. Oxygen produced will be forced into solution under the preferred 15 psig operating pressure of the system, but will be partially adsorbed by activated carbon media downstream.

UV Treatment

From the outlet of the first dual chamber housing A the water preferably travels to a 316L stainless steel UV reactor chamber 46. Reactor chamber 46 contains a low pressure, high output ultraviolet (UV) lamp, that is connected to an electronic ballast. The diameter of the UV lamp and stainless steel chamber are designed to provide a thin water layer between the lamp, and inside chamber wall. This forces the water into close proximity to the UV lamp, providing efficient utilization of the radiation. The UV lamp is designed for high output radiation at a wavelength of 185 nm for the reduction of total organic carbon in the water. A substantial portion of the radiation emitted is also in the 254 nm range, which will provide germicidal activity within the reaction chamber. This, in addition to the microbial control described for the KDF media, will substantially reduce the number of viable microbes within the system. The UV reactor is commercially available from Trojan Technologies Inc. of Ontario, Canada.

Water from the UV chamber will have a reduced specific resistance due to the production of carbon dioxide from the oxidation of organic substances in the chamber. The water from the chamber will also contain trace quantities of peroxide and ozone due to the action of the UV radiation on dissolved oxygen in the water. Some intermediate organic acids may also be present as a result of incomplete oxidation of organic material in the reaction chamber.

Peroxides and ozone can damage ion exchange resins, causing a loss of exchange capacity and an increase of TOC in the water. The loss of exchange capacity and TOC increase is a result of degradation of the polymer structure of the ion exchange resin. Exchange sites are destroyed and organic compounds are released into the water from the decomposing resin. These problems have typically been addressed by treatment with coal-based, coconut shell-based or synthetic activated carbon that are not specifically designed to remove peroxides. The coal, coconut shell and synthetic carbons will remove organic acids produced by the UV reaction. This is desirable to prevent the organic acids from passing through the resin and remaining in the product water of the device. However, these activated carbon types will vary significantly in capacity to remove the peroxide that jeopardizes the structural integrity of the ion exchange resin.

The oxidation reaction of organic compounds in water by UV radiation at wavelengths in the 185 nm range is complicated. Most technical descriptions of the process of organic destruction by UV oxidation agree that the primary reactants are hydroxyl free radicals produced in the reaction chamber. The hydroxyl radicals react with organic compounds, forming carbon dioxide and water. Carbon dioxide reacts with water to form carbonic acid that is removed by ion exchange. Hydroxyl radicals not consumed during the reaction with organic compounds form hydrogen peroxide.

Operation of the System

The schematics of FIGS. 1–4 depict four exemplary systems wherein the same letters and numerals refer to like elements.

FIG. 1 depicts a basic system configuration for purifying any of the preferred feed waters mentioned above. Water from feed source 40 enters pump 44 via pressure regulator 42, preferably maintained at 15±2 psig, then enters the top of chamber 1 of first dual housing A, flows downwardly through the media of chamber 1 and upwardly through plenum a', then downwardly through media in chamber 2, then exits chamber 2 through plenum a".

From first dual housing A the water is preferably fed to an UV reactor 46 where it is exposed to UV light, and then to top of chamber 1 of second dual housing B, whereupon it flows downwardly through the media of that chamber 1, up to the top of chamber 2 through plenum b', down through the media of chamber 2 of dual housing B, exiting that housing via plenum b".

The preferred media in dual housings A and B in FIGS. 1–4 are signified by the numerals 1–5 as follows:

1 redox media;
2 acid-washed bituminous activated carbon;
3 acid-washed coconut shell activated carbon;
4 semiconductor grade mixed bed ion exchange resin; and
5 catalytic activated carbon having a peroxide number of $\leq 14$.

Figure 2:
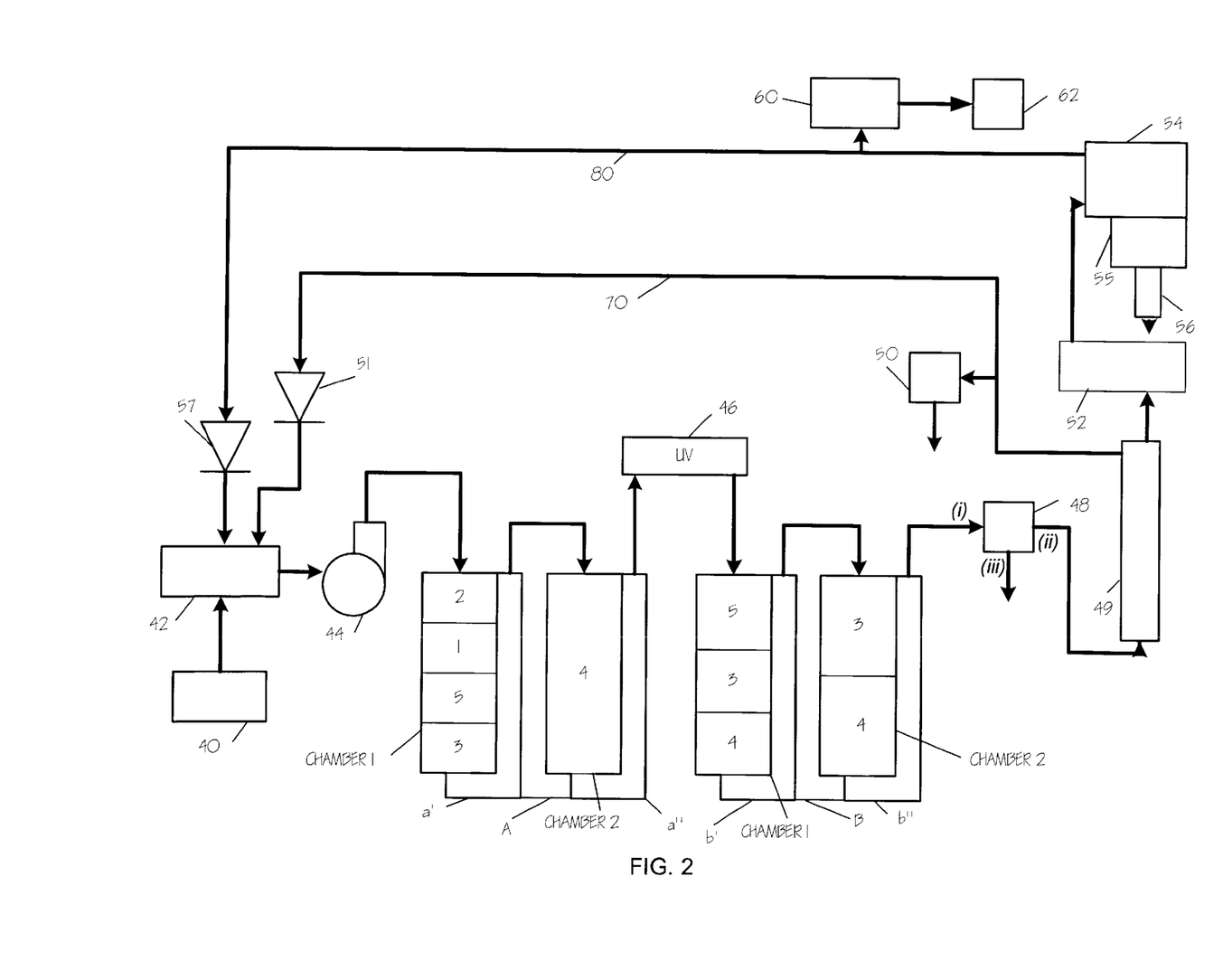
Figure 3:
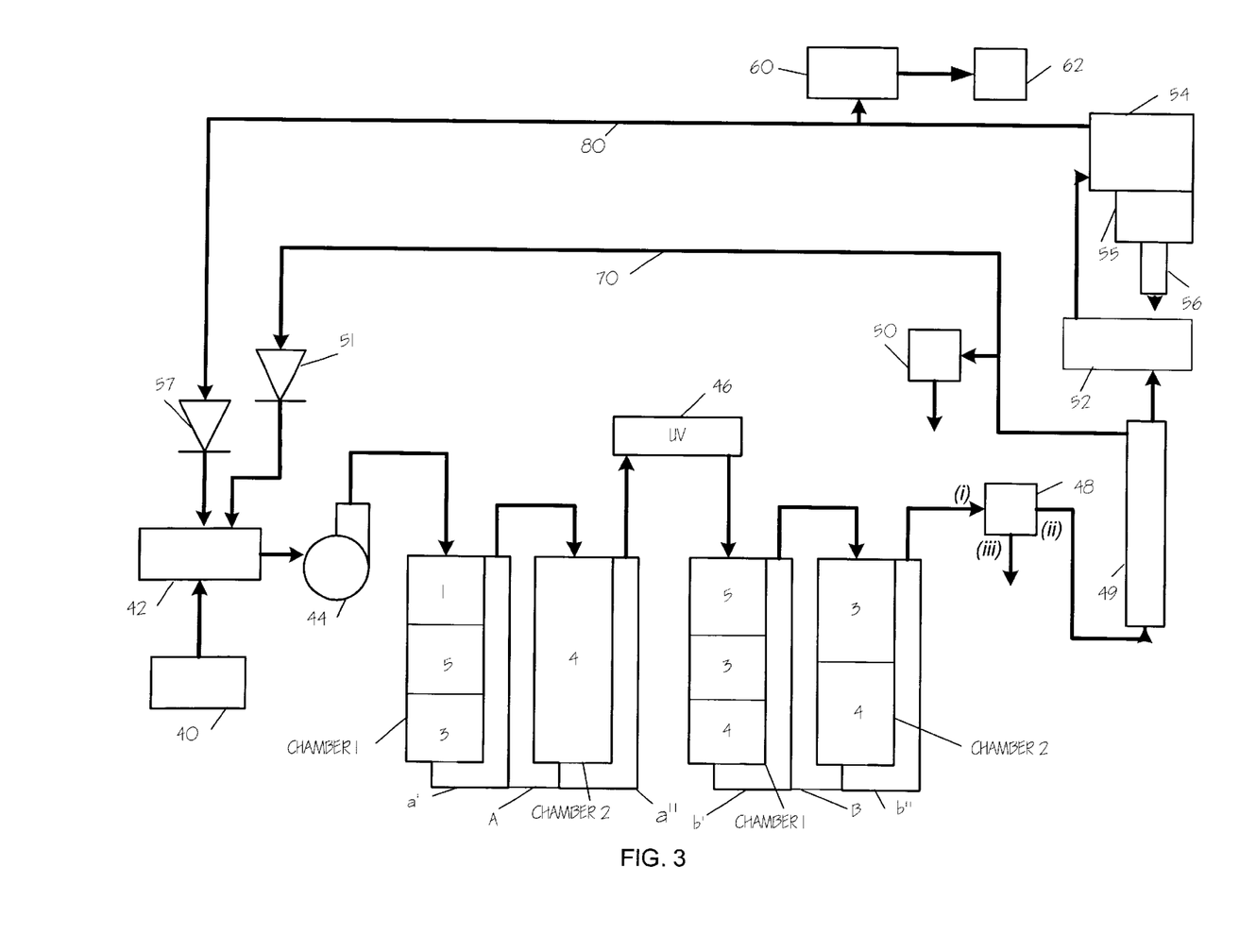
Figure 4:
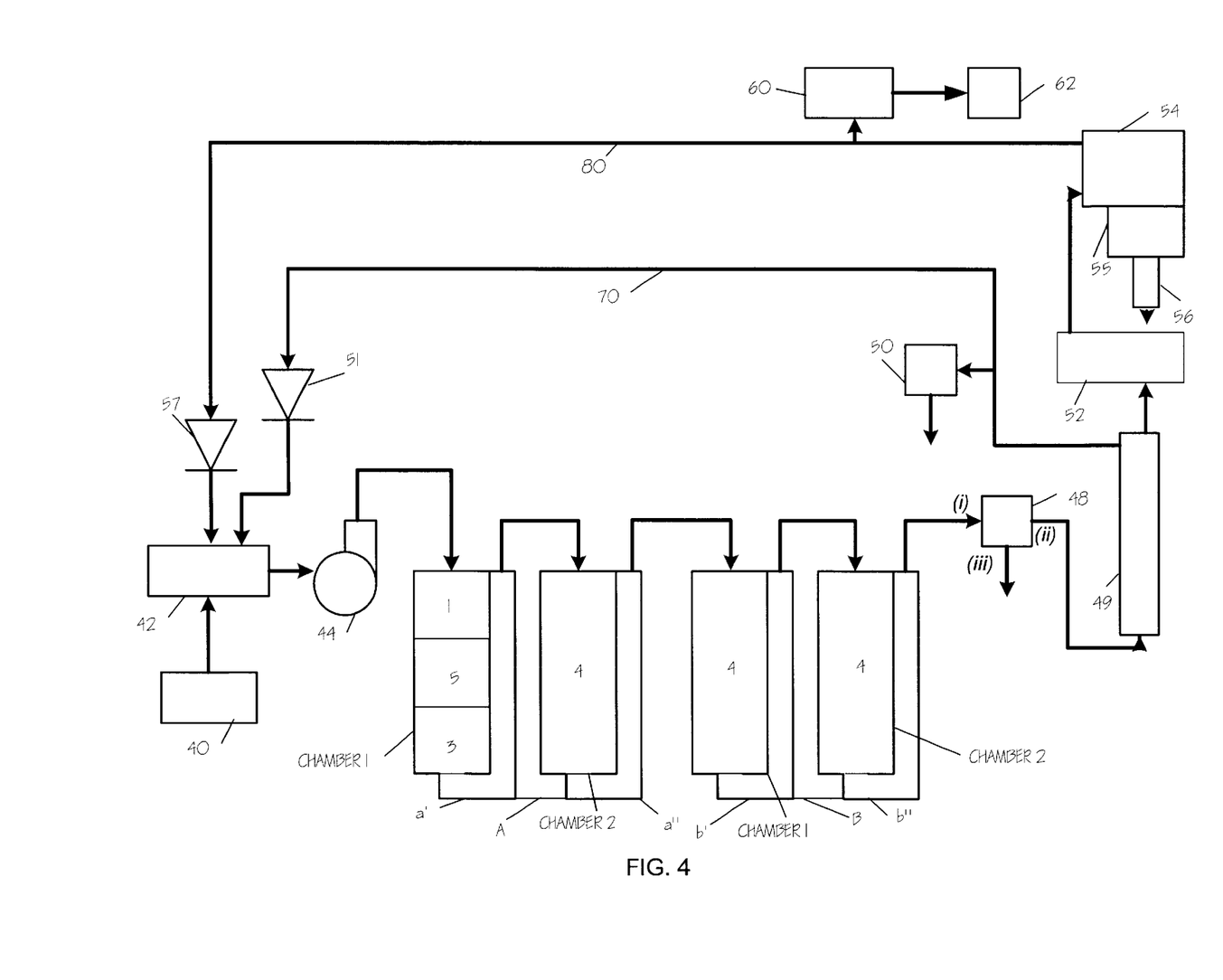
Figure 5:
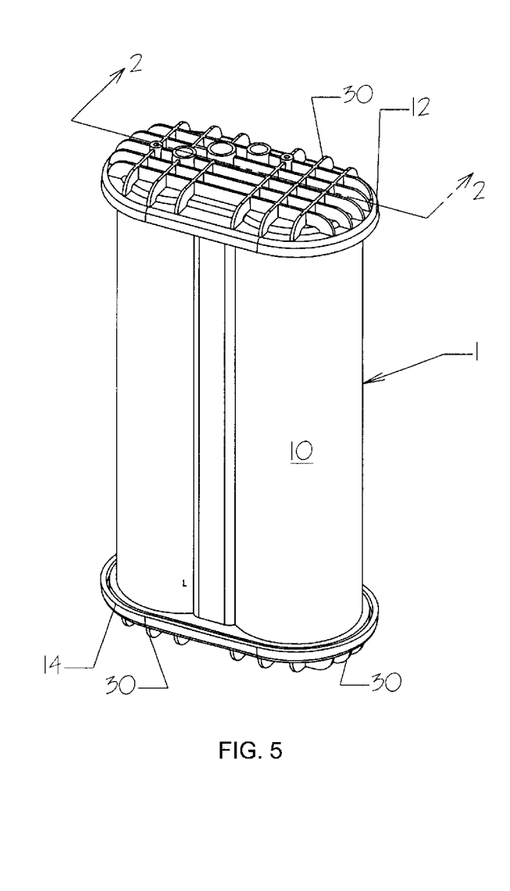
FIGS. 5–8 rare perspective, cross-sectional, elevational and exploded views of the preferred housings for containing the purification media used in the system of the present invention.
Figure 6:
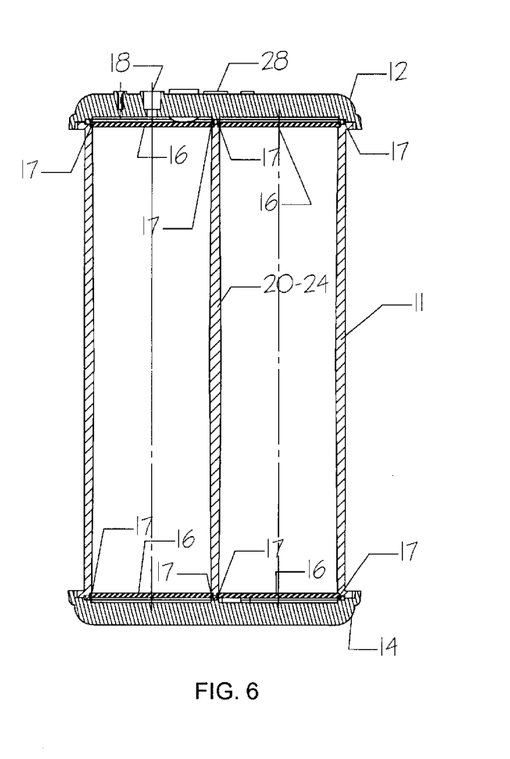
Figure 7:
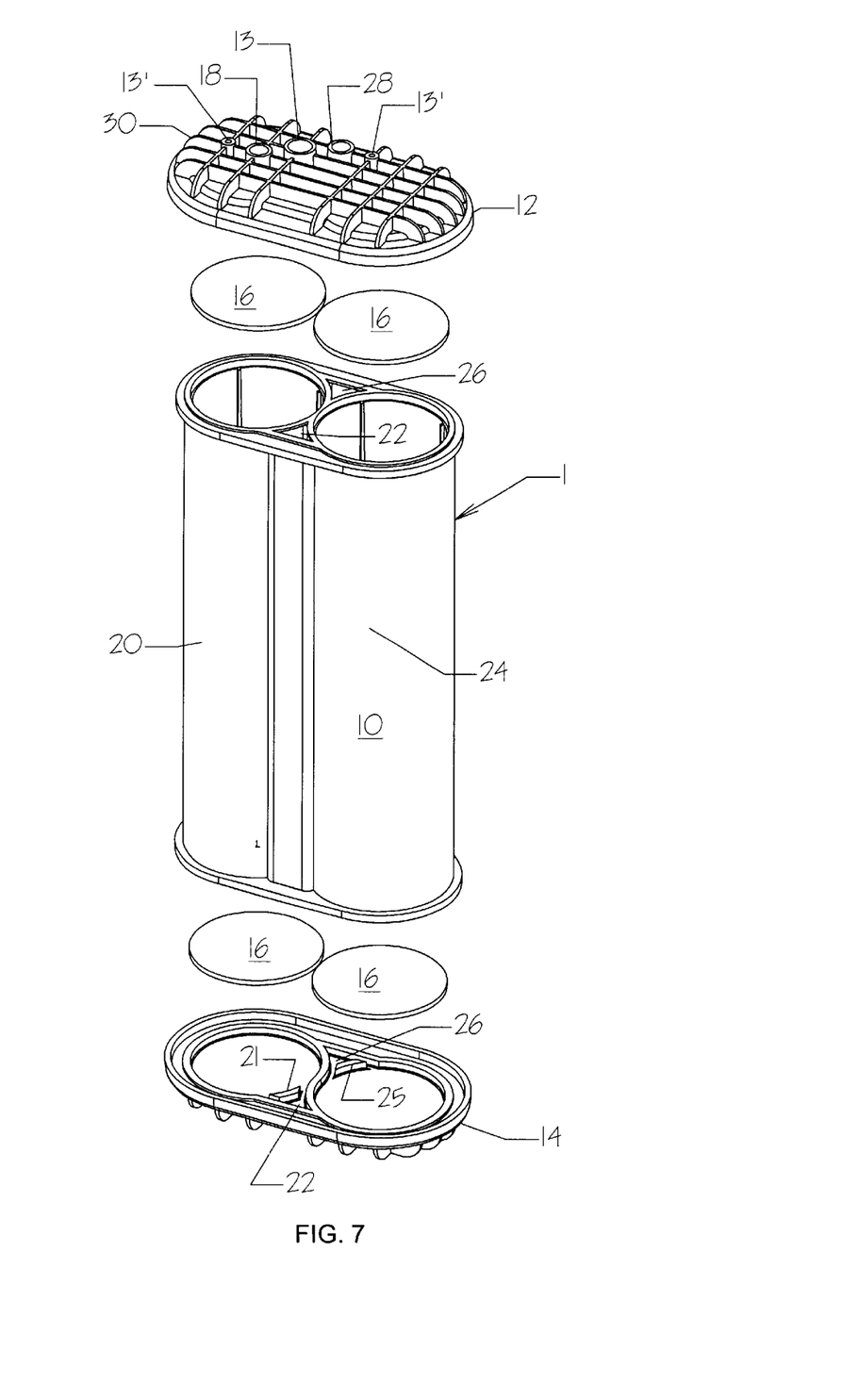

FIGS. 2–4 show similar flow arrangements to that shown in FIG. 1, but with the different combinations of purification media noted. FIG. 2 depicts a system especially suitable for treatment of tap water and water from DI and EDI sources, while FIG. 3 depicts a system suitable for treatment of water from distilled and RO sources and FIG. 4 depicts a system utilizing mostly ion exchange media, no UV treatment and is capable of high capacity or high volume throughput. The combination of materials depicted in FIG. 4 provides the greatest volume of ion exchange resin, thus providing the greatest ion exchange capacity. The arrangement depicted in FIG. 4 is best utilized when high ion exchange capacity is the most desirable for the application and higher TOC values in the effluent are of little or no concern. UV is not used due to the lack of catalytic carbon and activated carbon treatment downstream of the preferred UV location. UV in this mode of treatment would damage the resin in the second dual cartridge pack due to the generation of peroxides and/or ozone.

It is to be understood that the present invention contemplates the use of more than two dual housings, and that when this is the case, it is preferred that they be added in such a fashion that they are in series with dual housings A and B and that the flow is downwardly through the additional media contained therein.

After exit from dual housing B (or, in the case of more than two housings, the $n^{th}$ dual housing), the treated water is optionally preferably directed through ultrafilter (UF) isolation/flush valve 48 and ultrafilter 49. Ultrafilter 49 is in fluid communication with UF flush valve 50 and check valve 51 through recycle line 70 to prevent backflow of untreated feed water, and ultimately in communication with pressure regulator 42 and pump 44 for another cycle of treatment if necessary.

From ultrafilter 49 the treated water passes through a resistivity cell 52 where specific resistance of the water is determined. Pressure regulator 42 has four ports, namely, feed inlet 40, an outlet to pump 44 and two inlets from recirculation lines 70 and 80 via check valves 51 and 57, respectively. Feed inlet 40 provides pressure regulation to the other ports and only allows water to enter when ultrapure treated water is drawn from the system. Recirculated water from the concentrate and permeate of ultrafilter 49 supply pump 44 when water is not being drawn from the system. From resistivity cell 52 the water is fed to dispense valve 54 and then through final filter 55 and outlet 56. The outlet of the filter is the outlet 56 of the system. Dispense valve 54 allows undispensed treated water to be returned to the system via return line 80, and backflow of untreated feed water is prevented by check valve 57. TOC levels of the treated water are monitored by TOC sensor 62 that is in fluid communication with a prefilter 60.

The bed of catalytic activated carbon media is preferably followed by another bed of 20×50 mesh acid-washed coconut shell activated carbon for the removal of ozone and organic acids that may be produced in the UV reaction chamber. This is preferably followed by another bed of semiconductor grade high purity mixed bed ion exchange resin. This media makes up the remaining volume of the first chamber in the second dual housing B, and provides the system with additional ion exchange capacity while at the same time removing any carbon dioxide generated by the UV treatment as well as ionic material leached from the activated carbon.

Water exiting the bottom of the first chamber of the second dual housing B travels upward to the top of the second chamber in the second dual housing, where it preferably encounters another bed of acid-washed 20×50 mesh coconut shell activated carbon, which removes trace amounts of organics such as sulfonated styrene, methylamines and chlorinated hydrocarbons that may elute from the ion exchange resin located upstream. Such a media bed reduces the amount of organic contaminants present in the feed water at startup and throughout the life of the system.

The preferred final media bed is of semiconductor grade high purity mixed bed resin. This bed insures that the water exiting the last of the dual housings has a specific resistance of at least 18.2 megohm·cm at 25° C. with an extremely low TOC content in the ppb range.

For systems utilizing an ultrafilter 49, a three-way solenoid valve or isolation valve 48 is located downstream of the second dual housing B and prior to ultrafilter 49, to be utilized for initial flushing of the dual housings upon their installation. Water enters valve 48 at inlet (i) and exits outlet (ii) and flows to the inlet of ultrafilter 49 during normal operation. When new dual media housings A and B are installed, outlet (ii) is closed and outlet (iii) is opened to drain.

Isolation valve 48 is only activated when flushing of a freshly loaded dual housing is desired. Under normal operating conditions, the valve allows water to travel toward ultrafilter 49 and system outlet 56. The flushing sequence is provided upstream of ultrafilter 49 in order to prevent air and the initial rinse water from entering the ultrafilter housing. Due to the fairly low molecular weight cutoff rating (<30 Daltons) of the ultrafilter, it is preferred that the initial rinse water and air that would otherwise enter the ultrafilter housing be discharged prior to contacting the ultrafilter membrane. Some ultrafilter membranes of polyethersulfone (PES) are typically supplied in a pre-wetted condition in order to facilitate fluid flow. If the membranes become dry, flux will be reduced or cease altogether.

A number of potential contaminants in ultrafilter 49 can increase the time required for the water to reach the desired 18.2 megohm·cm purity level. Such potential contaminants include trapped air, particles, organic carbon compounds and charged ion exchange particles. Organic carbon compounds may adhere to the membranes and cause premature breakthrough of contaminants that will increase the TOC of the product water. Charged ion exchange particles can also stick to the membranes. Poor quality water from the initial volume of water leaving the last dual chamber housing can introduce ionic contaminants into the ultrafilter housing, membranes and membrane spacers that will also increase the time to reach an 18.2 megohm·cm level of purity. Although hollow fiber membranes may not be as susceptible as spiral-wound membranes to the problems associated with air contact due to the wetting agents typically used to initiate water permeation, they are nevertheless still subject to the aforementioned potential for particle, organic and ionic contamination typically observed during initial startup of purification systems.

For all of these reasons, it is desirable to eliminate these potential contaminants before they enter ultrafilter 49. To achieve this end, the three-way solenoid or isolation valve 48 is preferably constructed of an inert material such as polyvinylidene fluoride (PVDF), polypropylene (PP) or polytetrafluoroethylene (PTFE). A preferred isolation valve 48 is No. AS2036-S36 available from Precision Dynamics of New Britain, Conn. As an alternate, a two-way valve constructed of the same materials attached to a T coupling mounted in the flow path would also suffice as long as any dead volume created by the coupling is minimized, preferably to no larger than six times the ID of the flow path conduit. Preferred valves are those solenoid-activated valves that are normally closed, such as those wherein one port is normally open while a second port is normally closed (three-way), or those wherein the valve is normally closed (two-way). All such valves are preferably not activated until opened, which minimizes heat generated from the power required to open the valve. In contrast, a significant amount of heat would be generated within the system if power were continuously applied to the valve.

Ultrafilter 49 is located downstream of the isolation/flush valve 48 and is used to separate gram-negative bacterial endotoxins (lipopolysaccharides) and other organic molecules. As mentioned above, ultrafilter 49 may be from hollow fiber membranes or spiral-wound membranes, which are commonly used in the water purification industry. Ultrafilters are typically operated as cross-flow filters wherein feed water travels along the upstream side of the membrane surface to a concentrate or reject port, where it is eventually flushed out of the ultrafilter housing as the concentrate stream. In a spiral-wound ultrafiltration membrane, water passing tangentially through the spiral membrane is collected in a central tube and exits the housing as product water, commonly referred to as permeate.

Hollow fiber ultrafilters contain multiple hollow fibers that allow the feed water to travel from the inlet of the housing to the concentrate outlet, typically from the lumens or inside of the fibers to the outside and parallel to the fibers. Water is forced tangentially out of each of the fibers to the permeate side of the membrane. In both spiral-wound and hollow fiber ultrafiltration devices, the concentrate flow is typically restricted to create a pressure differential which forces water to the permeate side of the membrane. This restriction may be accomplished with check valve 51 having a cracking pressure of 5 psig or greater providing back pressure to the flow of water through ultrafilter 49. Typically, the concentrate stream is equal to about 10% of the total water volume provided to the filter.

In the system of the present invention both the concentrate and permeate streams are recirculated within the system via lines 70 and 80, respectively. Concentrate flow may be controlled via check valve 51 or by a relief valve or restrictor (not shown but located in the same relative position). Concentrate water is returned to the suction side of the system pump 44 via pressure regulator 42 for recirculation. A solenoid-activated UF concentrate flush valve 50 is preferably located in the concentrate stream line 70 that allows for periodic high flow flushing of the concentrate stream to drain. This is done once in 24 to 48 hours to assist in cleaning the upstream side of the membranes of the ultrafilter. A preferred flush valve 50 is No. B20371-S2 from Precision Dynamics of New Britain, Conn.

Downstream of ultrafilter 49 there is preferably a resistivity cell 52 preferably made of the same inert polymers mentioned above. A sensor in the resistivity cell 52 is used to monitor the specific resistance and/or electrical conductivity of the water, with the temperature standardized to 25° C. Resistivity cell 52 is connected to a meter control device that displays the specific resistance or conductivity of the water in the system. Preferably, the sensor is provided with the capability to shut off the temperature correction feature so as to allow direct monitoring of the specific resistance or conductivity via the system's electronic control. Temperature is optionally displayed.

Water leaving the resistivity cell 52 travels a short distance to a draw-off or dispense valve 54 for the delivery of purified water having a specific resistance of at least 18.2 megohm·cm at 25° C. with low TOC content. Dispense valve 54 is preferably a three-way valve which when opened for draw-off of purified water closes or restricts the flow downstream of the valve, thereby providing a one-way path for the water, preventing it from flowing backward in the system. A preferred dispense valve 54 is No. PCT42-14-2 from Entegris Inc. of Chaska, Minn.

Located at the outlet is a final filter 55 preferably comprising a polyethersulfone (PES) membrane situated in a polypropylene (PP) housing. Such a final filter 55 is available from Sartorius AG of Goettingen, Germany as Sartopore®SP2-150. Outlet 56 coincides-with the outlet of final filter 55 and preferably contains a bell housing to prevent airborne contamination.

With the system in normal operation and with dispense valve 54 closed, water flows through valve 54 to its downstream side and thence via return line 80 back to the suction side of pump 44 through pressure regulator 42. A check valve 57 is located between dispense valve 54 and suction side of pump 44 to prevent feed water contamination from reaching dispense valve 54. Check valves 51 and 57 also provide backpressure within the system to promote laminar flow. When dispense valve 54 is opened to dispense water, recirculation line 80 is closed or restricted to force water to final filter 55 and outlet 56.

Downstream of dispense valve 54, a TOC sensor 62 is provided for on-line TOC analysis. This allows the end user to monitor TOC and/or the trend in TOC change in the purified water produced by the system. By providing connection to a TOC measuring device at this location, one can expect to monitor TOC based on a worst case for the system inasmuch as this is the closest point to the point-of-use and the purified water will have contacted the greatest surface area of system components prior to draw-off. In addition, by locating TOC sensor 62 here, product water is protected from any contamination by the analyzer should a failure occur. Any dead-leg volume, even the smallest, is eliminated upstream of the delivery point.

The TOC sample is obtained by a sampling mechanism preferably in the form of a three-way T valve that allows small quantities of water to pass to the TOC sensor 62 for analysis, preferably constructed of PVDF or PTFE. A preferred three-way T valve for this purpose is No. F4TU4 from Parker Hannifin Corp. of Ravenna, Ohio. A fitting is provided that allows the connection of a small syringe style filter 60. Without the use of filter 60, TOC sensor 62 is subject to operational interference from particles and bacteria in the water treatment system. Filter 60 is preferably rated up to 0.45-micron pore diameter and is designed to separate particles and bacteria from the water prior to the water entering TOC sensor 62. The filter is preferably constructed of PP and PES. However, filters made of polycarbonate and PES or polymade, PVDF and PES or PP and cellulose acetate (CA) have also been shown to be acceptable. (It should be noted that CA filter material might tend to shed more particles and wetting agents when installed and so may therefore require additional rinsing prior to installation and during service life.) In addition, glass fiber filtration devices may be useful. When filter 60 is of similar construction to filter 55 located before outlet 56, TOC analysis results better reflect that which is expected from the outlet of the system.

A preferred type of filter 60 is the Luer-Lock syringe type. However, similar small filters utilizing National Pipe Thread (NPT), hose-barb or other sanitary connecting mechanism will suffice. Such a filter should not be limited to 0.2 or 0.45-micron pore size if a larger pore size has shown to be sufficient for the application intended.

EXAMPLE

A water purification system of substantially the same configuration as shown in FIG. 2 was assembled and evaluated utilizing RO feed water. The RO system consisted of a dual membrane unit with activated carbon and pleated filter pretreatment. The RO product water had a specific resistance of 85 to 150 Kohm·cm at 25° C. and a TOC content of 0.5 to 0.8 ppm and was contained in a 40-liter pressure vessel that delivered water at approximately 55 psig to the purification system via polyethylene tubing.

The lab water system contained a Trojan Technologies UV reaction chamber 46 and a hollow fiber ultrafilter 49 comprising a polycarbonate housing, polyurethane potting and polyamide S hollow fiber membranes.

Two dual housings A and B, each with two chambers having a volume of 1,400 cc, for a total volume of 5,600 cc, were filled with the preferred forms of purification media noted in FIG. 2 in the following order of contact and volume percentages: housing A, chamber 1 16.6% media 2, 8.3% media 1, 16.6% media 5 and 58.5% media 3; housing A, chamber 2 100% media 4; housing B, chamber 1 20.8% media 5, 25% media 3 and 54.2% media 4; and housing B, chamber 2 20.8% media 3 and 79.2% media 4. After installation of the dual housings A and B, the feed water line to the system was opened, power was supplied to the system and a rinse cycle was started. Water entering the system passed through a pressure regulator 42 set at 15±2 psig to a diaphragm pump 44 that pressurized the feed water to 35 psig for delivery to the system. Water leaving pump 44 entered the first dual housing A for treatment before flowing to the UV reactor chamber 46. Water leaving UV reactor chamber 46 entered the second dual housing B for treatment. Water exiting the second dual housing B was flushed to drain for about 20 minutes via an isolation/flush valve 48 (Precision Dynamics No. AS2036-536) located upstream of ultrafilter 49, amounting to about a 5-bed volume rinse of dual housings A and B or just over a 10-bed volume of rinse for the ion exchange resin in the dual housings. This wetted all system components upstream of ultrafilter 49 and rinsed out fine particles and the majority of surface impurities from the plumbing and from the ion exchange resin.

After the 20-minute flush cycle, isolation/flush valve 48 was closed and UF flush valve 50 (Precision Dynamics No. B20371-52) was opened on the concentrate side of ultrafilter 49. Dispense valve 54 (Entegris No. PVT4-2-14-2) and UF flush valve 50 were also opened at this time to permit water to flush to drain for 15 minutes via both the concentrate and permeate side of ultrafilter 49 so as to remove air and wetting agents therefrom. After this 15-minute flush cycle, flush valve 50 was closed and water was flushed to drain via dispense valve 54 for 5 more minutes to pressurize the system to normal operation mode and assist in flushing remaining air from the system. Water passing to dispense valve 54 traveled through a cell well containing a conductivity/resistivity cell 52 electronically connected to a meter.

Water on the concentrate side of ultrafilter 49 was allowed to circulate back to pressure regulator 42. A 10-psi check valve 51 located in concentrate stream 70 provided backpressure to ultrafilter 49, thereby permitting water at system pressure to pass to the ultrafiltration module for final rinsing. After the 5-minute rinse, dispense valve 54 was closed, allowing water to circulate back to pressure regulator 42 via line 80. Dispense valve 54 shut off water flow in line 80 downstream of the valve 54 when valve 54 was opened for draw-off of purified water, thereby preventing product water bypass during draw-off. Circulation line 80 contained a check valve 57 rated at 0.5 psig, helping to balance the system flow during recirculation and providing some backpressure to the system to promote laminar flow.

After the system rinse, an 0.2-micron PES surfactant pre-wetted membrane filter 55 (Sartorius Sartopore®SP2-

150) was attached to dispense valve 54 via ¼-inch NPT. This filter was rinsed with 8–10 liters of system water to remove the wetting agents. At this point treated water was allowed to recirculate in the system for one hour while the resistivity of the water was monitored with a Thornton 200CR meter and 0.1 constant cell that were calibrated to National Institute of Standards and Technology standards. After approximately 20 minutes of recirculation, the specific resistance of the purified water was 18.03 to 18.12 megohm·cm corrected to 25° C. Several short interval drops below 18.0 megohm·cm were observed. After one hour of recirculation, resistivity stabilized at about 18.0 megohm·cm.

After this stabilization of resistivity the outlet of the same PES 0.2-micron filter used with dispense valve 54 was attached via Teflon tubing to a Sievers Model 800 TOC analyzer for online TOC analysis and water was supplied to the analyzer at approximately 3 psig. TOC analysis was performed over several hours in accordance with the instrument instructions and ranged from 13.0 to 18.0 ppb. At this point the system was put in a standby mode overnight whereby the system was shut off for 45 minutes and circulated water for 15 minutes of every hour.

The next morning the system was turned on and allowed to circulate for 30 minutes prior to starting the TOC analyzer. TOC ranged from 8.9 to 4.5 ppb over several hours. The TOC analyzer was disconnected from the system for High Pressure Liquid Chromatograph (HPLC) sampling analysis for organic compound content of the purified water.

An Ehrlynmeyer flask was heated to 400° C. for three hours to remove any inherent organic carbon compounds, then cooled for one hour with an aluminum foil cover, then a 125-mL sample of system product water was collected in the flask. The sample was analyzed by reverse phase High Performance Liquid Chromatography (HPLC) using a Beckman Ultrasphere C-18, 5-micron column with a C-18 Guard column. This HPLC system consisted of a Model 126 solvent module and Model 168 detector, utilizing System Gold 32 Karat software. Initial setup of the chromatograph was with 100% acetonitrile at 2.0 mL/min. At time zero, the chromatograph switches to 100% water sample mobile phase. A 60-mL sample of water was pumped through the column at 2.0 mL per min. At the end of the 60-mL sample enrichment a gradient back to 100% acetonitrile is performed at 2.0 mL/min over the next 30 minutes with sample integration at 65 minutes of run time. The 210 nm chromatogram is the most critical for detecting potentially interfering organic compounds. No significant peaks were observed from the sample at 210 nm or at 254 nm, indicating the absence of any interfering organic compounds.

After the HPLC analysis the system was operated for about 8 hours during the next 4 days and again put in standby mode each night. Up to 10 L of water was drawn from the system each day. TOC ranged as low as 0.28 to 0.62 ppb. A TOC range of 1.5 to 2.5 ppb was observed after extended sampling, comprising continuous on-line analysis for two hours. Specific resistance remained at around 18.0 megohm·cm for the entire 4-day period. This system continued to operate at a purity level of 18.2 megohm·cm with less than 1.0 ppb TOC for several months before replacing final filter 55.

The water feed to the system was switched to municipal tap water. Approximately 10 L of water was run to drain from the system to ensure that system holdup volume was replaced with tap water. The tap feed water exhibited a specific resistance of 4.1 to 4.6 Kohm·cm. Tap water TOC levels ranged from 1.3 to 1.8 ppm. Free chlorine levels ranged from 0.20 to 0.28 ppm. The system was run for several days with the tap water feed, and specific resistance of the system's purified water product water was found to be in the 18.0 to 18.2 megohm·cm range, with TOC at less than 5.0 ppb and no detectable free chlorine.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A system for the production of ultrapure water having a specific resistance of at least 18.0 megohm.cm and a total organic carbon content of less than one ppb comprising the following elements all in fluid communication with each other:
   (a) a source of feed water;
   (b) a pump;
   (c) at least two dual housings A and B containing at least five water purification media, wherein each dual housing has two juxtaposed chambers 1 and 2 separated by a common wall and in series fluid communication with each other;
   (d) an ultraviolet reactor chamber between two of said at least two dual housings;
   (e) a specific resistance sensor;
   (f) an ultrafilter having a rating of 30,000 Dalton molecular weight cutoff situated between said at least two dual housings and said specific resistance sensor;
   (g) a first flush valve between said at least two dual housings and said ultrafilter and a second flush valve and a second check valve between said ultrafilter and said pump;
   (h) a dispense valve capable of delivering ultrapure water from the system and preventing upstream flow when dispensing;
   (i) a point-of-use filter downstream and proximate to said dispense valve and having an average pore size rating of up to 0.2 micron and capable of removing particles and bacteria;
   (j) a first check valve between said pump and said dispense valve to prevent backflow of feed water; and
   (k) a sampling port with filter attachment in communication with an instrument capable of analyzing total organic carbon content of the ultrapure water produced by the system wherein dual housing A contains the following media in the following order in chambers 1 and 2:
   chamber 1
      redox media
      acid-washed coconut shell activated carbon
   chamber 2
      semiconductor grade mixed bed resin
and dual housing B contains the following media in the following order in chambers 1 and 2:
   chamber 1
      catalytic activated carbon having a peroxide number of $\leq 14$
      acid-washed coconut shell activated carbon
      semiconductor grade mixed bed resin
   chamber 2
      acid-washed coconut shell activated carbon
      semiconductor grade mixed bed resin.

2. The system of claim 1 wherein said redox media comprises granules of a Cu/Zn alloy, said acid-washed coconut shell activated carbon is 20×50 mesh and said catalytic activated carbon having a peroxide number of ≦14 comprises a mixture of oxidized and calcinated bituminous coal and coal tar pitch.

3. A system for the production of ultrapure water having a specific resistance of at least 18.0 megohm·cm and a total organic carbon content of less than one ppb comprising the following elements all in fluid communication with each other:
  (a) a source of feed water;
  (b) a pump;
  (c) at least two dual housings A and B containing at least five water purification media, wherein each dual housing has two juxtaposed chambers 1 and 2 separated by a common wall and in series fluid communication with each other;
  (d) an ultraviolet reactor chamber between two of said at least two dual housings;
  (e) a specific resistance sensor;
  (f) an ultrafilter having a rating of 30,000 Dalton molecular weight cutoff situated between said at least two dual housings and said specific resistance sensor;
  (g) a first flush valve between said at least two dual housings and said ultrafilter and a second flush valve and a second check valve between said ultrafilter and said pump;
  (h) a dispense valve capable of delivering ultrapure water from the system and preventing upstream flow when dispensing;
  (i) a point-of-use filter downstream and proximate to said dispense valve and having an average pore size rating of up to 0.2 micron and capable of removing particles and bacteria;
  (j) a first check valve between said pump and said dispense valve to prevent backflow of feed water; and
  (k) a sampling port with filter attachment in communication with an instrument capable of analyzing total organic carbon content of the ultrapure water produced by the system wherein dual housing A contains the following media in the following order in chambers 1 and 2:
  chamber 1
    acid-washed bituminous activated carbon
    redox media
    catalytic activated carbon having a peroxide number of ≦14
    acid-washed bituminous activated carbon
  chamber 2
    semiconductor grade mixed bed ion exchange resin
and dual housing B contains the following media in the following order in chambers 1 and 2:
  chamber 1
    catalytic activated carbon having a peroxide number of ≦14
    acid-washed coconut shell activated carbon
    semiconductor grade mixed bed ion exchange resin
  chamber 2
    acid-washed coconut shell activated carbon
    semiconductor grade mixed bed ion exchange resin.

4. The system of claim 2 wherein said redox media comprises granules of a Cu/Zn alloy, said acid-washed coconut shell activated carbon is 20×50 mesh and said catalytic activated carbon having a peroxide number of ≦14 comprises a mixture of oxidized and calcinated bituminous coal and coal tar pitch.

5. A system for the production of ultrapure water having a specific resistance of at least 18.0 megohm·cm and a total organic carbon content of less than one ppb comprising the following elements all in fluid communication with each other:
  (a) a source of feed water;
  (b) a pump;
  (c) at least two dual housings A and B containing at least five water purification media, wherein each dual housing has two juxtaposed chambers 1 and 2 separated by a common wall and in series fluid communicating with each other;
  (d) an ultraviolet reactor chamber between two of said at least two dual housings;
  (e) a specific resistance sensor;
  (f) an ultrafilter having a rating of 30,000 Dalton molecular weight cutoff situated between said at least two dual housings and said specific resistance sensor;
  (g) a first flush valve between said at least two dual housings and said ultrafilter and a second flush valve and a second check valve between said ultrafilter and said pump;
  (h) a dispense valve capable of delivering ultrapure water from the system and preventing upstream flow when dispensing;
  (i) a point-of-use filter downstream and proximate to said dispense valve and having an average pore size rating of up to 0.2 micron and capable of removing particles and bacteria;
  (j) a first check valve between said pump and said dispense valve to prevent backflow of feed water; and
  (k) a sampling pert with filter attachment in communication with an instrument capable of analyzing total organic carbon content of the ultrapure water produced by the system wherein dual housing A contains the following media in the following order in chambers 1 and 2:
  chamber 1
    redox media
    catalytic activated carbon having a peroxide number of ≦14
    acid-washed coconut shell activated carbon
  chamber 2
    semiconductor grade mixed bed ion exchange resin
and dual housing B contains the following media in the following order in chambers 1 and 2:
  chamber 1
    catalytic activated carbon having a peroxide number of ≦14
    acid-washed coconut shell activated carbon
    semiconductor grade mixed bed ion exchange resin
  chamber 2
    acid-washed coconut shell activated carbon
    semiconductor grade mixed bed ion exchange resin.

6. The system of claim 3 wherein said redox media comprises granules of a Cu/Zn alloy, said acid-washed coconut shell activated carbon is 20×50 mesh and said catalytic activated carbon having a peroxide number of ≦14 comprises a mixture of oxidized and calcinated bituminous coal and coal tar pitch.

7. A system for the production of ultrapure water having a specific resistance of at least 18.0 megohm.cm and a total organic carbon content of less than one ppb comprising the following elements all in fluid communication with each other:

(a) a source of feed water;

(b) a pump;

(c) at least two dual housings A and B containing at least five water purification media, wherein each dual housing has two juxtaposed chambers 1 find 2 separated by a common wall and in series fluid communication with each other;

(d) an ultraviolet reactor chamber between two of said at least two dual housings;

(e) a specific resistance sensor;

(f) an ultrafilter having a rating of 30,000 Dalton molecular weight cutoff situated between said at least two dual housings and said specific resistance sensor;

(g) a first flush valve between said at least two dual housings and said ultrafilter and a second flush valve and a second check valve between said ultrafilter and said pump;

(h) a dispense valve capable of delivering ultrapure water from the system and preventing upstream flow when dispensing;

(i) a point-of-use filter downstream and proximate to said dispense valve and having an average pore size rating of up to 0.2 micron and capable of removing particles and bacteria;

(j) a first check valve between said pump and said dispense valve to prevent backflow of feed water; and (k) a sampling port with filter, attachment in communication with an instrument capable of analyzing total organic carbon content of the ultrapure water produced by the system wherein dual housing A contains the following media in the following order in chambers 1 and 2:

chamber 1
  redox media
  catalytic activated carbon having a peroxide number of $\leq 14$
  acid-washed coconut shell activated carbon
chamber 2
  semiconductor grade mixed bed ion exchange resin and dual housing B contains the following media in the following order in chambers 1 and 2:

chamber 1
  semiconductor grade mixed bed ion exchange resin
chamber 2
  semiconductor grade mixed bed ion exchange resin.

8. The system of claim 4 wherein said redox media comprises granules of a Cu/Zn alloy, said acid-washed coconut shell activated carbon is 20×50 mesh and said catalytic activated carbon having a peroxide number of less 14 comprises a mixture of oxidized and calcinated bituminous coal and coal tar pitch.

* * * * *

UNITED STATES PATENT AND TRADEMARK OFFICE
CERTIFICATE OF CORRECTION

PATENT NO. : 6,579,445 B2
DATED : June 17, 2003
INVENTOR(S) : Nachtman et al.

It is certified that error appears in the above-identified patent and that said Letters Patent is hereby corrected as shown below:

Column 1,
Line 49, delete "rare" and insert -- are --.

Column 2,
Line 47, delete "12" and insert -- 10 --.

Figure 8:
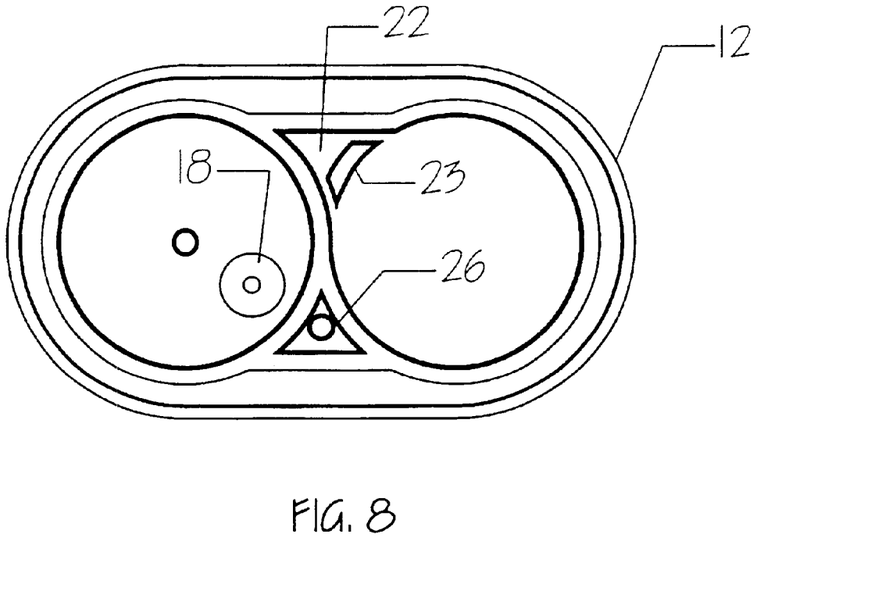

Column 3,
Line 5, delete "which" and insert -- best seen in FIG. 8, which is an elevational view of the inside of the top end cap 12. Flow distributor 23 --.

Column 4,
Line 46, delete the hypen "-" between "are" and "better".

Column 17,
Line 8, delete "find" and insert -- and --.

Column 18,
Line 3, delete the comma "," between "filter" and "attachment".
Line 26, change "less 14" to -- $\leq 14$ --.

Signed and Sealed this

Thirteenth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,579,445 B2
DATED : June 17, 2003
INVENTOR(S) : Nachtman et al.

It is certified that error appears in the above-identified patent and that said Letters Patent is hereby corrected as shown below:

<u>Column 16,</u>
Line 37, delete "pert" and insert -- port --.

Signed and Sealed this

Eighteenth Day of May, 2004

JON W. DUDAS
*Acting Director of the United States Patent and Trademark Office*